Feb. 13, 1951    J. B. RICHARDSON    2,541,481
TRACTOR PROPELLED BUCK RAKE
Filed Nov. 18, 1949    2 Sheets-Sheet 1
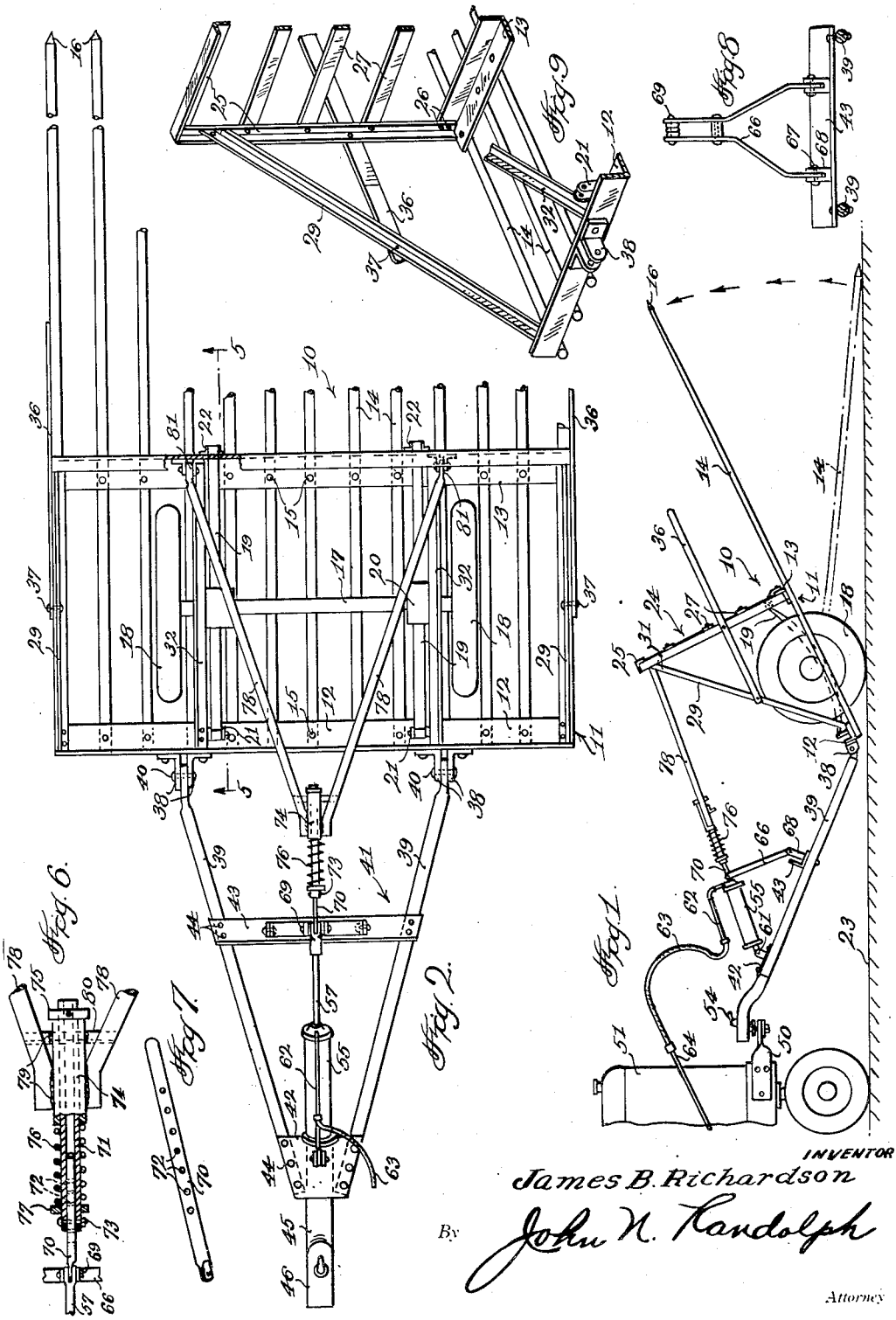
INVENTOR
James B. Richardson
By John N. Randolph
Attorney

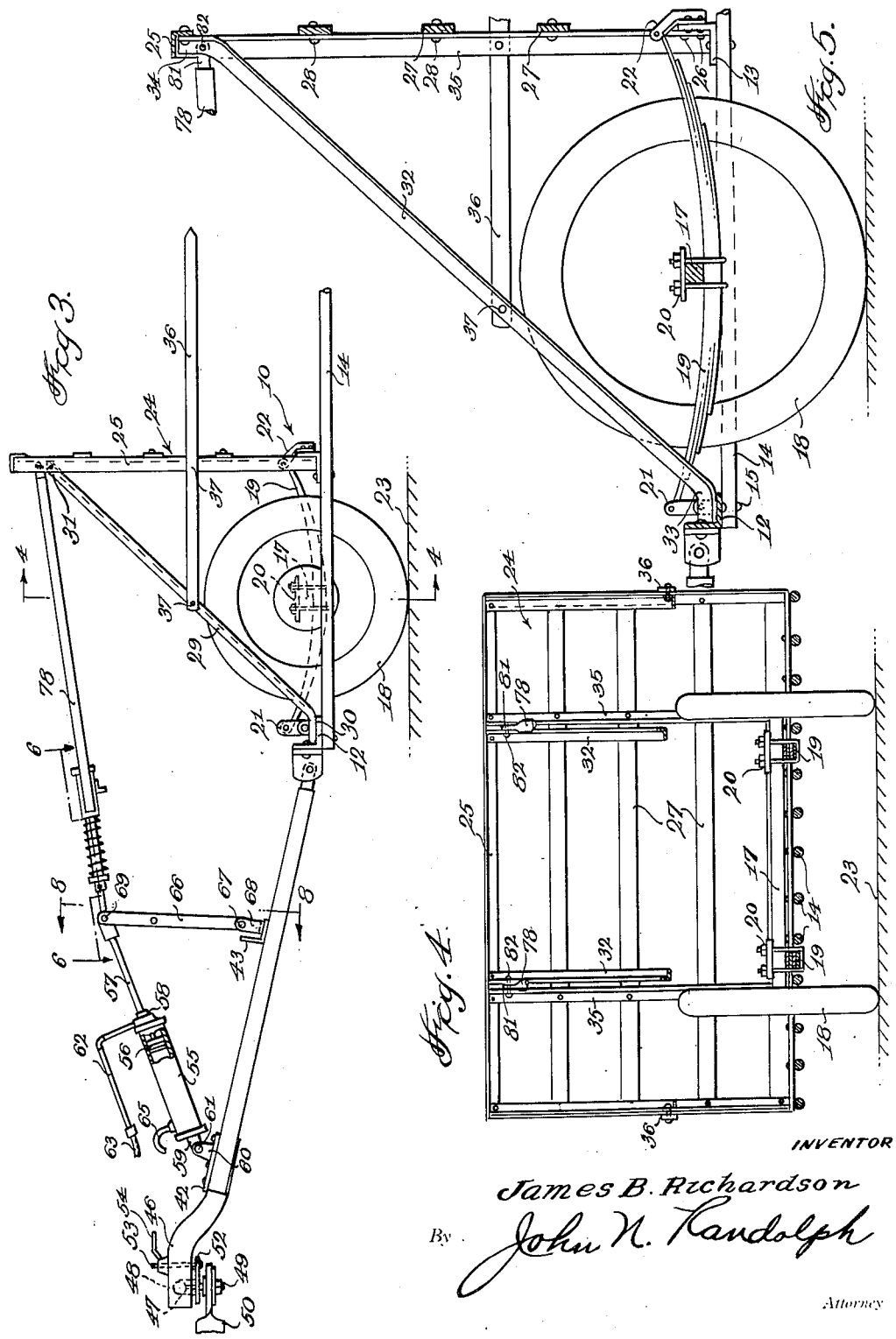

Patented Feb. 13, 1951

2,541,481

UNITED STATES PATENT OFFICE 2,541,481

TRACTOR PROPELLED BUCK RAKE

James B. Richardson, Huson, Mont.

Application November 18, 1949, Serial No. 128,178

6 Claims. (Cl. 56—27)

This invention relates to a novel construction of tractor propelled buck rake or sweep rake for use in picking up hay or the like as from a windrow or swath and for transporting the hay to a delivery point.

More particularly, it is an aim of the present invention to provide a buck rake of extremely simple construction which may be quickly and easily attached to or detached from a conventional tractor and connected to the hydraulic system thereof so that the buck rake may be propelled by the tractor and raised and lowered by operation of the tractor hydraulic system and under the control of the tractor operator.

Still a further and particular important object of the present invention is to provide a buck rate which may be quickly and easily adjusted to tractors having coupling means disposed at different elevations and without affecting the extent that the forward end of the buck rake may be elevated.

Another object of the invention is to provide a buck rake having ground engaging supporting wheels on which the rake frame is yieldably supported so that the rake will be conveyed smoothly over rough terrain thereby minimizing the amount of hay which will escape therefrom; and which is provided with cushioning means for yieldably urging the forward end of the rake downwardly and into engagement with the ground, yet which will permit the rake frame to pivot relatively to its ground supporting wheels to enable the forward ends of the rake teeth to ride over humps or obstructions in the path of movement of the teeth.

Various other objects and advantages of the invention will hereinafter become more fully apparent from the following description of the drawings, illustrating a presently preferred embodiment thereof, and wherein:

Figure 1 is a side elevational view showing the buck rake attached to the forward end of a tractor and disposed in an elevated position;

Figure 2 is a fragmentary top plan view of the buck rake on an enlarged scale;

Figure 3 is an enlarged fragmentary side elevational view of the buck rake shown connected to the coupling means of a tractor;

Figure 4 is a cross sectional view thereof taken substantially along a plane as indicated by the line 4—4 of Figure 3;

Figure 5 is an enlarged fragmentary vertical sectional view taken substantially along a plane as indicated by the line 5—5 of Figure 2;

Figure 6 is a view partly in horizontal section and partly in top plan taken substantially along a plane as indicated by the line 6—6 of Figure 3 and on an enlarged scale;

Figure 7 is a perspective view on an enlarged scale of one of the elements as shown in Figure 6;

Figure 8 is a cross sectional view taken substantially along a plane as indicated by the line 8—8 of Figure 3, and Figure 9 is a fragmentary perspective view of a portion of the buck rake.

Referring more specifically to the drawings, the buck rake in its entirety is designated generally 10 and includes a frame, designated generally 11, having parallel transversely extending cross members 12 and 13, each of which is formed of angle iron and includes a horizontally disposed side and an upstanding, vertically disposed side. The vertically disposed sides of the cross members 12 and 13 are remotely disposed relatively to one another and the horizontal sides of said cross members are connected to the rear end portions of each of a plurality of tines or teeth 14 which extend longitudinally of the buck rake 10 or at right angles to the cross members 12 and 13. The cross members 12 and 13 are secured by fastenings 15 to the teeth 14 and said teeth 14 are fastened to the rear cross member 12 adjacent the rear ends thereof and extend to substantially beyond the forward cross member 13 and are preferably provided with tapered, pointed forward ends 16.

An axle 17 is disposed within the frame 11 and transversely of the buck rake 10 and between and substantially parallel to the cross members 12 and 13. The axle 17 is disposed above and spaced slightly from the intermediate teeth 14 and is of a length substantially less than the width of the buck rake 10. A ground engaging wheel 18 is journaled on each end of the axle 17 and said wheels have lower portions extending downwardly between adjacently disposed teeth 14 and which lower portions are adapted to engage the ground. The wheels 18 are equally spaced from the two outermost teeth 14 and are preferably disposed so that there are three teeth 14 located outwardly of each wheel 18, as clearly illustrated in Figure 2. The intermediate portion of a leaf spring 19 is secured to the underside of the axle 17 inwardly of and adjacent each wheel 18 by a spring clamp 20, said springs extending longitudinally of the buck rake and being pivotally connected at their ends to spring shackles 21 and 22 which are secured to and rise from the cross members 12 and 13, respectively. Accordingly, it will be readily apparent that the buck rake frame 11 and the teeth 14 are yieldably supported relatively to the ground engaging wheels 18 by the springs 19 for yielding movement upwardly and downwardly with respect to a surface 23 over which the buck rake 10 is moving.

The buck rake 10 is provided with an upstanding transversely extending wall 24 including a substantially inverted U-shaped frame 25 which is formed of angle iron and the depending ends of the legs of which are suitably secured by fastenings 26 to the ends of the forward cross member 13. The wall 24 also includes transversely extending vertically spaced slats or bars 27 which are secured by fastenings 28 to the upright legs of the wall frame 25. Said wall 24 constitutes a part of the buck rake frame 11 and is braced and maintained in an upright position relatively to the tines 14 by two corresponding end braces 29 having corresponding ends 30 which are suitably secured to the rear cross member 12 and corresponding opposite ends 31 which are suitably fastened to the upright legs of the wall frame 25, said braces 29 extending diagonally upwardly and forwardly from the rear cross member 12 to the wall 24. The frame 11 is also provided with intermediate diagonal braces 32 which are disposed inwardly of and adjacent the wheels 18 and which have corresponding lower ends 33, as best seen in Figure 5, which are secured to the rear cross member 12 and opposite upper ends which are curved upwardly and which are secured to the upper, intermediate portion of the wall frame 25, as seen at 34 in Figure 5. The wall 24 also includes intermediate upright braces or frame members 35, one of which is disposed adjacent the upper end 34 of each brace 32 and which members 35 are secured at their lower ends to the forward cross member 13 and at their upper ends to the intermediate portion of the wall frame 25. The members 29, 32 and 35 are likewise formed of angle iron and said members 32 and 35 have adjacent, parallel sides, for a purpose which will hereinafter become apparent.

The buck rake 10 is provided with side bars 36 which are secured by fastenings 37 to the frame upright 25 and to the side braces 29 which are disposed therebehind, as best illustrated in Figure 3. The side bars 36 extend forwardly of the wall 24 and are spaced substantially above the tines 14 to prevent the load from falling transversely off of said tines.

The upright side of the rear cross member 12 is provided with spaced pairs of ears 38 which extend rearwardly therefrom and each of which pairs of ears is adapted to receive an end of a frame leg 39, which frame leg ends are pivotally connected to the ears 38 by pivot pins 40 for thereby pivotally connecting the frame, designated generally 41 to the rear cross member 12. Said frame 41 includes the legs 39, an end plate 42 and a cross brace 43. The legs 39 converge rearwardly from the cross member 12 and have their rearwardly disposed converging ends connected by the plate 42 and their intermediate portions braced by the cross brace 43, which plate and cross brace are connected to the legs 39 by suitable fastenings 44. A tubular member 45 has one end thereof secured to the underside of the plate 42 and extends therefrom away from the legs 39 and is provided with an upwardly offset opposite end 46 which is provided with a downwardly opening socket 47, as indicated in Figure 3, which is adapted to receive the upstanding ball-shaped head 48 of a coupling pin 49 which rises from a bracket 50 which is supported on the forward end of a tractor, the forward portion of which is shown in Figure 1 at 51. As seen in Figure 3, a bar 52 is swively connected to the coupling pin 49 and has a bolt 53 extending upwardly therefrom through the upwardly offset tubular portion 46 for receiving a nut 54 which is tightened to bear downwardly on said tubular portion 46 to hold the socket 47 thereof in engagement with the coupling pin ball 48.

A hydraulic cylinder 55 has a piston 56 disposed reciprocally therein and which is provided with a piston rod 57 which extends reciprocally through the forward end 58 of the cylinder 55. The opposite, rear end of the cylinder 55 is provided with an extension 59 which is received between a pair of upstanding ears 60 which rise from the plate 42 and which is pivotally connected thereto by a pin 61. A conduit 62 is connected to and communicates with the forward end 58 of the cylinder 55 and has a flexible extension or hose 63 which is adapted to be detachably connected to a pipe 64 leading from a conventional hydraulic system of the tractor 51 and by which the hydraulic medium under pressure at the control of the operator of the tractor 51 can be supplied to the forward end of the cylinder 55 for displacing the piston 56 and piston rod 57 rearwardly therein. The rear end of the cylinder 55 is provided with a vent pipe 65 for ordinarily venting the rear end of the cylinder 55 but which may be connected to a second conduit of the hydraulic system of the tractor 51 for supplying a hydraulic medium under pressure to the opposite end of the cylinder 55 for driving the piston 56 forwardly. However, said piston 56 will be moved forwardly by the weight of the portion of the buck rake 10 located forwardly of the axle 17, as will hereinafter become apparent.

A standard 66 is pivotally mounted at 67 at its lower end on a bracket 68 which rises from the cross brace 43 and is pivotally connected by a pin 69 at its upper end to the forward end of the piston rod 57. A rod 70 is pivotally connected at one end thereof by the pivot pin 69 to the standard 66 and piston rod 57 and extends forwardly therefrom reciprocally into the rear end of a tube 71. The rod 70 is provided with longitudinally spaced openings 72 for selectively receiving the shank of a nut and bolt fastening 73 which extends through the tube 71 for adjustably connecting said rod and tube for varying the distance between the pivot pin 69 and the forward end of the tube 71. The tube 71 extends reciprocally through a sleeve 74 and has a collar 75 fixed to its forward end which limits its rearward sliding movement with respect to the sleeve 74. An expansion coiled spring 76 is carried by the tube 71 and has its forward end bearing against the rear end of the sleeve 74 and its rear end bearing against a collar 77 which is fixed to the tube 71 and which urges said tube rearwardly relatively to the sleeve 74.

A pair of arms 78 are secured as by welding as seen at 79 to the sleeve 74 and are additionally connected to one another and to said sleeve by a cross brace 80 to which the arms and sleeve are likewise welded, as seen at 79. The arms 78 extend forwardly from the sleeve in diverging relationship to one another and have substantially parallel forward ends 81 which are disposed between the spaced upper portions of the adjacent members 32 and 35 and which are pivotally connected thereto by pivot pins 82, as best seen in Figures 4 and 5.

From the foregoing it will be readily apparent that the pusher frame 41 may pivot on the pins 40 relatively to the buck rake frame 11 so that the frame 41 may extend upwardly and rearwardly at any desired angle with respect to the plane of the tines 14. Accordingly, the tube end 46 may be disposed at any desired level for engaging the coupling pin head 48 so that the buck rake 10 may be attached to tractors having coupling pins disposed at different levels.

With the pusher frame 41 thus attached to the tractor 51, the rod 70 may be adjusted by the fastenings 73 relatively to the tube 71 so that the piston 56 will be disposed adjacent the forward end 58 of the cylinder 55 when the buck rake teeth are inclined downwardly and forwardly as illustrated in dotted lines in Figure 1. In this, the normal position of the buck rake teeth 14, the buck rake 10 can be propelled forwardly so that the forward ends of the teeth 14 which are in contact or substantially contacting the ground surface 23 may pick up hay or other material from a windrow or swath as the buck rake is propelled forwardly by the tractor 51. After the buck rake has thus been loaded, the hydraulic medium under pressure is supplied from the system of the tractor through the conduits 63 and 62 to the forward end of the cylinder 55 for forcing the piston 56 rearwardly. The rearward movement of the piston rod 57 will cause the standard 66 to swing rearwardly thereby exerting a pull on the rod 70, tube 71 and sleeve 74 which will thus exert a pull on the upper end of the wall 24 through the forwardly diverging arms 78 to thus cause the rear end of the frame 11 to pivot on the axis of the pins 40 relatively to the pusher frame 41 and to rock on the axle 17 for depressing the rear end of the frame 11 and for elevating the forward end of the tines 14 to thereby cause the buck rake 10 to assume its elevated, full line position of Figure 1, in which position the load may be conveyed readily to the point of discharge. After the buck rake 10 has been unloaded the weight of the portion thereof disposed forwardly of the axle 17 will normally cause the buck rake to return to its dotted line position of Figure 1 when the hydraulic pressure in the forward end of the cylinder 55 is released so that the pipe 65 can ordinarily be used merely as a vent pipe and need not be connected to a source of hydraulic pressure for returning the buck rake to a lowered, operative position although this movement may be accomplished by the hydraulic medium, if desired. The spring 19 will yieldably support the tines relatively to the ground engaging wheels 18 for minimizing vibrations of the buck rake thus reducing to a minimum the amount of hay which will escape between the buck rake teeth 14 while picking up or conveying a load of hay or other loose material. Likewise, should the forward ends 16 of the tines 14 strike a hump or obstruction, the spring 76 will permit the tines to swing upwardly on the axle 17 as a pivot due to the fact that the sleeve 74 can slide rearwardly on the tube 71 against the action of the spring 76, thus allowing the frame to rock counterclockwise on the axle 17, as seen in Figure 3. After the tines have passed over the obstruction, the spring 76 will return the buck rake frame 11 to its normal operative position so that the forward ends 16 of the teeth are yieldably held by the spring 76 in an operative position, as illustrated in dotted lines in Figure 1.

The buck rake 10 can be quickly and easily attached to or detached from the coupling hitch post 49 of a tractor, as previously described, and the adjustability of the rod 70 relatively to the tube 71 enables the buck rake to be mounted on tractors having coupling pins 49 disposed at different levels.

Various modifications and changes are contemplated and may obviously be resorted to, without departing from the spirit or scope of the invention as hereinafter defined by the appended claims.

I claim as my invention:

1. A tractor propelled buck rake comprising a frame disposed transversely to the direction of travel of the buck rake, a pair of transversely aligned ground engaging wheels for supporting said frame, a plurality of teeth connected to the frame forwardly and rearwardly of said wheels and extending forwardly to substantially beyond said frame, a pusher frame pivotally connected to the rear end of said frame and extending rearwardly therefrom, said pusher frame having a downwardly opening socket at its rear end adapted to receive an upwardly extending coupling pin mounted on the forward end of a tractor, a wall rising from the buck rake frame forwardly of said wheels, a standard pivotally connected to and rising from the pusher frame intermediate of its ends, linkage means pivotally connected to said wall adjacent its upper end and pivotally connected to the standard, a cylinder pivotally connected at one end thereof to the pusher frame and extending forwardly from its pivoted end toward said standard, a piston reciprocally mounted in said cylinder, a piston rod projecting from the piston through the opposite end of said cylinder and pivotally connected to the upper end of the standard, said cylinder being adapted to receive a medium under pressure for forcing said piston toward the pivoted end of the cylinder for swinging the standard away from the buck rake frame for exerting a pull on said linkage means to rock the buck rake frame relatively to the ground engaging wheels for elevating the forward ends of the buck rake teeth.

2. A buck rake as in claim 1, said linkage means including telescopically connected sections, and spring means for urging said sections toward extended positions for normally urging the wall to swing away from said pivoted standard for yieldably urging the forward ends of the buck rake teeth downwardly.

3. A buck rake as in claim 1, said pusher frame being swingable relatively to the buck rake frame for positioning the downwardly opening socket thereof for engaging coupling pins disposed at different elevations.

4. A buck rake as in claim 1, said pusher frame being swingable relatively to the buck rake frame for positioning the downwardly opening socket thereof for engaging coupling pins disposed at different elevations, and said linkage means including extensible sections adjustable relatively to one another for adjustably positioning the piston in the cylinder.

5. A buck rake as in claim 1, and detachable fastening means swivelly connected to the coupling pin for releasably retaining said socket in engagement with the coupling pin.

6. A buck rake as in claim 1, said ground engaging wheels being disposed between the forward and rear ends of the buck rake frame and between portions of adjacently disposed buck rake teeth, an axle disposed above certain of the buck rake teeth and on which said wheels are journaled, and leaf springs pivotally connected at their ends to the forward and rear ends of the buck rake frame and secured intermediate of their ends to said axle.

JAMES B. RICHARDSON.

No references cited.